May 19, 1970   R. W. SARGENT   3,512,252
ELECTROFORMED INNER TUBE FOR TANK UNIT
Filed Sept. 30, 1966

INVENTOR
RAYMOND W. SARGENT
BY *Edwin E. Greigg*
ATTORNEY

United States Patent Office 3,512,252
Patented May 19, 1970

3,512,252
ELECTROFORMED INNER TUBE FOR TANK UNIT
Raymond W. Sargent, Burlington, Vt., assignor to Simmonds Precision Products, Inc., Tarrytown, N.Y., a corporation of New York
Continuation-in-part of application Ser. No. 301,961, Aug. 14, 1963. This application Sept. 30, 1966, Ser. No. 583,272
Int. Cl. H01g 17/00
U.S. Cl. 29—601            3 Claims

ABSTRACT OF THE DISCLOSURE

Disclosed is a method of constructing an electrode assembly for a capacitance sensing unit by electroforming the inner electrode to a profile dictated by a linear law related to the shape of the container in which the unit is to be used and assembling said electrode concentrically within an outer electrode.

---

This application is a continuation-in-part application of Ser. No. 301,961, filed Aug. 14, 1963, now Pat No. 3,299,492.

This invention relates to a process for constructing dielectric contents gauge capacitors and more particularly to a process for constructing such a gauge which can be used in an irregular shaped container.

As described in U.S. Pat. No. 2,582,399, capacitor gauges which are used with irregular shaped containers are commonly profiled, that is, one of the electrodes of the capacitance sensing unit which is immersed in the fluid of the container is profiled or contoured to a shape which is specially correlated with the irregular shape of the container. This profile shape is dictated by a suitable linear law relating to the changing capacitance with changing fluid quantity in such irregular containers.

It is an object of this invention to provide a simple inexpensive method of fabricating the profiled or shaped electrode of the capacitance sensing unit employed with irregular shaped tanks or containers.

It is another object of this invention to provide a method for fabricating a profiled electrode tube of thin lightweight metal electrodeposited on a matrix of expendable material.

It is another object of this invention to provide a method for fabricating a profiled electrode of a capacitance sensing unit which requires no machining, cementing or other metal working operations.

It is yet another object of this invention to provide a method for fabricating a profiled electrode structure for use with a capacitance sensing unit which is composed of a hollow tube of thin lightweight metal that performs at high temperatures and is unaffected by moisture and humidity.

According to one embodiment utilizing the principles of this invention, the electrode structure is constructed from an electroform which is a comparatively inexpensive step in the process of this invention since the cost of the material and electrical current for deposition of electroform material is minimal. The process of providing the electroform electrode structure includes the step of providing a suitable matrix on which the electroform is accomplished. In the new process of forming the electroform electrode structure it has been found that the matrix must be either fusible or soluble. Fusible materials may include wax or low temperature metals such as Cerro metals, while soluble materials may include certain plastics such as polystyrene or acrylics that are literally dissolved, or soluble materials such as aluminum, magnesium and other lightweight metals and alloys which are readily etched away by means of contact with a caustic compound or solution.

Other objects and advantages will become apparent from a reading of the following specification and drawings in which.

Figure 1:
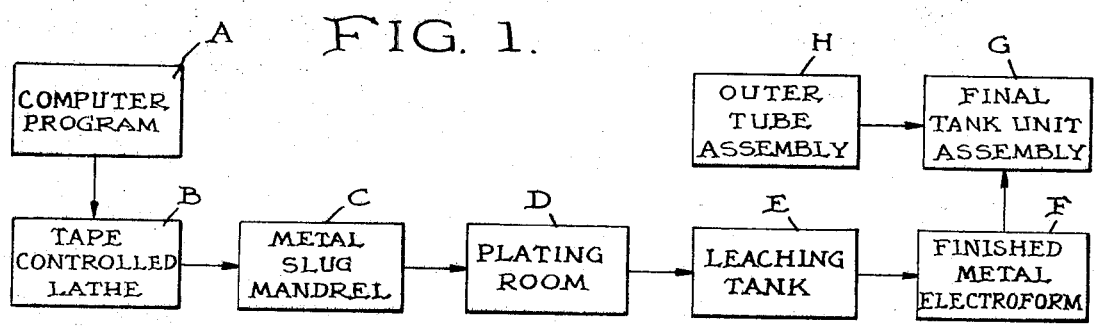
FIG. 1 is a schematic diagram illustrating the steps embodied by the process according to the principles of this invention.
Figure 2:
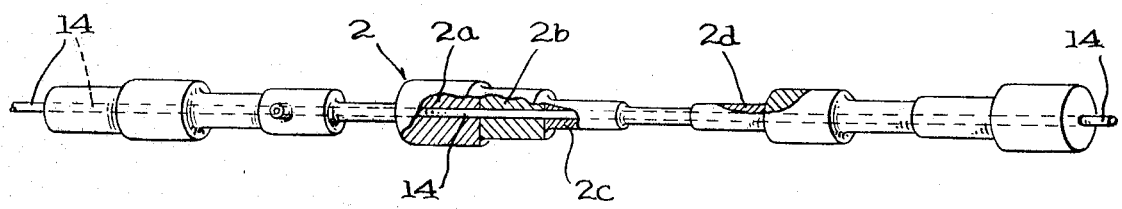
FIG. 2 is a perspective view illustrating the inner electroform electrode member on a series of tube members forming the expendable matrix.
Figure 3:
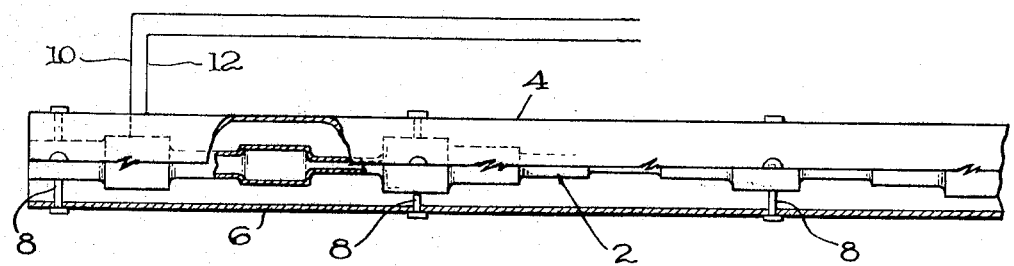
FIG. 3 is a view partially in elevation and cross-section illustrating the assembled capacitance sensing unit.

Referring now to FIG. 1, one preferred embodiment of the invention is making a matrix of lightweight metal in tubular form. Thus, in accord with the first three steps A, B, C the metal which may be aluminum or some other lightweight metal or alloy in tubular form is machined down according to the profile law for the particular container in which the finished capacitance sensing unit is to be used. Proceeding to step D a thin metal ranging in thickness from approximately 0.003 inch to 0.008 inch is electrodeposited over the metal matrix. The electrodeposited material may be a pure metal such as copper, nickel, silver or platinum or it may be a suitable alloy of these metals in various combinations. The next step E as seen in FIG. 1 requires the removal of the metal matrix from the outer electrodeposited coating. This is done by running a caustic solution through the tubular metal matrix. Caustic solutions used for this purpose are sodium hydroxide, calcium hydroxide and other similar agents which will attack and dissolve away the matrix material, which is aluminum in this particular case. Upon complete removal of the matrix material there is left the electrodeposited coating which forms an inner electrode 2 as shown in FIG. 2. The electrode structure 2 is of lightweight material and consists of a thin shell of sufficiently strong material to form the inner tube of an electrode unit 4. This inner tube 2 is shaped according to the profile laws relating to the particular shape of the container in which the capacitance sensing unit is to be used as previously mentioned. The inner electrode tube 2 is now ready for assembly with an outer electrode tube 6 as designated by the steps F, G, H in FIG. 1. The inner electrode 2 may be secured to the outer electrode 6 by means of insulated spaces 8 as best shown in FIG. 3. Leads 10, 12 may be brought into both electrodes at one end of the capacitance sensing unit. This unit upon conclusion is measurably lighter than F which indicates fiber glass units. Tests have shown that the capacitance sensing unit assembled according to the principles of this invention gives high endurance, is strong and durable and which will withstand high temperatures as well as severe vibration.

Another method utilizing the steps illustrated in FIG. 1 involves the use of fusible materials, such as waxes or low temperature metals known as Cerro metals. These materials are again machined or worked according to a suitable profile law as above-described and are used as the matrix over which the metal is electrodeposited. These ingredients can be removed by temperatures which would not affect the electrodeposited metal, for example, nickel. One significant advantage of this embodiment is that by accurate machining close tolerances are obtained, and there is no necessity for initial adjustment of the unit. Depending on production requirements it may be desirable to machine the matrix material on an automatic lathe. In this method, according to the steps A, B in FIG. 1 the lathe produces the matrix element or mandrel automatically, since it may be programmed by tape or a selective control means as a full length tube or as a series of drilled slugs each having different diameters according to the profile law computed for the particular tank in which the capacitance unit is to be used. The series of drilled slugs 2a, 2b, 2c, 2d as shown in FIG. 2 will be threaded like beads upon a support rod 14 or the like. This arrangement also facilitates destruction of the mandrel or matrix by allowing the caustic solutions to circulate through the center hole after withdrawal of the supporting rod 14.

Another method for fabricating the matrix would be to construct a mold using the above-mentioned materials and having the shape designated by the appropriate profile law for the particular container in which the new improved capacitance sensing unit is to be used. As in the previously described methods the next step involves electrodepositing a suitable metal layer upon the outside surface of a matrix.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. Method of making a matrix inner electrode tube in a tank profiled light weight capacitance sensing unit comprising the steps of assembling a plurality of tubes having different diameters and arranged in end-to-end relationship according to a profile law for the tank in which said capacitance sensing unit is used, said tubes defining an axial passageway therealong, electrodepositing a thin layer of metal completely upon the outside surface of said assembled tubes, removing said tubes from the outer metal electrodeposit to form a hollow metal electrode inner tube, assembling the electrode inner tube concentric with and spaced from an outer electrode tube and attaching electrodes to the inner electrode tube and the outer electrode tube.

2. Method of making a matrix inner electrode tube in a tank profiled light weight capacitance sensing unit comprising the steps of assembling a plurality of tubes having different diameters and arranged in end-to-end relationship according to a profile law for the tank in which said capacitance sensing unit is used, said tubes defining an axial passageway therealong, electrodepositing a thin layer of metal completely upon the outside surface of said assembled tubes, removing said tubes from the outer metal electrodeposit to form a hollow metal electrode inner tube and assembling the electrode inner tube concentric with and spaced from an outer electrode tube.

3. Method of making a matrix inner electrode tube in a tank profiled light weight capacitance sensing unit comprising the steps of assembling a plurality of tubes of different diameters in end-to-end relationship, said tubes being composed of fusible materials from the group consisting of waxes and low temperature metals and defining an axial passageway therealong, electrodepositing a thin layer of metal completely upon the outside surface of said assembly, removing the fusible material from the electrodeposited metal by heating said fusible material and causing the same to run off to thereby form a hollow metal electrode inner tube and assembling the electrode inner tube concentric with and spaced from an outer electrode tube.

References Cited

UNITED STATES PATENTS

| 2,592,614 | 4/1952 | Stoddard | 204—9 |
| 2,793,989 | 5/1957 | Goodman et al. | 204—9 |
| 2,613,178 | 10/1952 | Grant | 204—9 |
| 2,216,893 | 10/1940 | Smith | 29—624 |
| 2,759,134 | 8/1956 | Sullivan | 317—246 |
| 2,789,435 | 4/1957 | Weiss | 317—246 XR |
| 3,123,751 | 3/1964 | Balsbaugh | 317—246 |
| 3,148,314 | 9/1964 | Ponemon | 317—246 |

FOREIGN PATENTS

| 696,900 | 7/1953 | Great Britain. |
| 733,359 | 7/1955 | Great Britain. |

JOHN F. CAMPBELL, Primary Examiner

R. W. CHURCH, Assistant Examiner

U.S. Cl. X.R.

29—624; 204—9; 303—95, 96, 97, 98; 317—242, 246